Patented Aug. 10, 1937

2,089,433

UNITED STATES PATENT OFFICE 2,089,433

CATALYST AND CATALYTIC PROCESS

Paul L. Salzberg, Edge Moor, Del., assignor to E. I. du Pont de Nemours & Company, Wilmington, Del., a corporation of Delaware No Drawing. Application September 7, 1934, Serial No. 743,088

6 Claims. (Cl. 23—236)

This invention relates to catalysts and catalytic processes and more particularly to highly efficient chromite catalysts and processes for their preparation and use.

Several different methods for the preparation of chromite hydrogenation and dehydrogenation catalysts have previously been disclosed, such, for example, as are set forth in detail in U. S. Patents 1,746,782 and 1,964,000 to Wilbur A. Lazier. The chromite catalytic bodies produced as described in these patents, i. e. by igniting a multiple chromate of a nitrogen base and a hydrogenating metal, are particularly efficacious and are characterized by great superiority of catalytic activity as compared with that of catalysts prepared, for example, by the reduction of a chromate by means of hydrogen at temperatures below 600° C.

In addition to the improved catalytic effect produced by the catalysts described in the Lazier patents, it has also been shown therein that the activity of chromite catalysts so prepared may be improved still further if the calcined product is treated to remove the less active substances present in such products, by leaching the said calcined product with a weak acid, or if the ignited chromite is reduced in hydrogen before use.

It is an object of this invention to prepare chromite catalysts of the general character described in the Lazier patents but showing even greater activity when used in the hydrogenation or dehydrogenation of carbon compounds in either liquid or vapor phase.

It is also an object of the present invention to provide a process for the production of superior chromite catalysts which is more economical than processes previously proposed.

Other objects and advantages of the invention will be apparent by reference to the following specification in which the preferred embodiments and details of this invention are set forth.

Highly efficient chromite catalysts, which are characterized by an increased activity in the hydrogenation and dehydrogenation of carbon compounds, are prepared by igniting a multiple chromate of a nitrogen base and a hydrogenating metal and thereafter extracting the resultant chromite composition with ammonia. That is, altho the preparation and ignition of the multiple chromate may be effected as described by Lazier, instead of extracting the chromite with dilute acid as shown in U. S. Patent 1,746,782 or reducing it with hydrogen as shown in U. S. Patent 1,964,000, the chromite, according to this invention, is treated with ammonia to extract therefrom the uncombined copper oxide and undecomposed chromium trioxide. The preparation of the chromites before extraction may be accomplished, by precipitation and ignition of a multiple chromate of a nitrogen base and a hydrogenating metal, as described in U. S. Patents 1,746,782, 1,746,783, 1,857,921, 1,895,516, 1,949,425, 1,964,000, or 1,964,001, but, as previously stated, it is not necessary that the chromites be reduced or acid extracted as shown by these patents. In other words, the invention substantially comprises ammonia extraction of the chromite catalysts shown by Lazier and, as well, the use of said ammonia-extracted catalysts in hydrogenations and dehydrogenations generally.

In like manner, as is set forth by Lazier, in the patents above enumerated, the catalysts of this invention may be prepared, up to the ammonia extraction step, by heating multiple chromates of one or more hydrogenating metals and nitrogen bases to their spontaneous decomposition temperature. Altho I shall describe the use of ammonium compounds and of particular metals, it is to be understood that by the term nitrogen base I include, besides ammonium compounds, organic derivatives such as salts of pyridine, aniline, methyl amine, and the like. In like manner other hydrogenating and dehydrogenating metals may be substituted for those described in the examples hereinafter set forth.

The ammonia extracted chromites thus prepared are highly suitable for hydrogenation of carbon compounds generally, such, for example, as those set forth in the Lazier patents hereinbefore enumerated, and are especially suitable for the hydrogenation of acids, esters, glycerides, or any compound containing the carbonyl group, such, for example, as ethyl hydroxystearate, stearic acid, furfural, cocoanut oil, and the like.

The catalysts, as prepared according to this invention, may also be used for the dehydrogenation of organic hydroxy compounds and, altho particularly useful for the liquid phase dehydrogenation of high boiling hydroxy compounds, such as hydroxystearin, decahydro-beta-naphthol, cyclohexanol, methylcyclohexanol, and the like, they may be used generally for dehydrogenation reactions including those described in the above enumerated Lazier patents.

An important feature of this invention, from the standpoint of operating economy resides in the fact that the liquor recovered from the ammonia extraction may be reutilized for precipitation of the next batch of catalyst, thus conserving not only the ammonia content of the liquor but also the hydrogenating metal and chromium oxide dissolved therein. Approximately one-third of the amount of the ammonia extract liquor is required to react with the chromic acid to form ammonium bichromate before precipitation of metal ammonium chromate begins. This amount of the recovered ammonia liquor may, therefore, be used to aid in dissolving the metal nitrate and chromic acid, the remaining two-thirds being then used for precipitation.

I have found that approximately fifty per cent. of the ammonia content of the ammonia extract liquor may be reutilized for further precipitations or recovered by conventional means and as well approximately fifty per cent. of the metal oxide and chromate contained in said extract liquor may be similarly recovered.

Accordingly the consumption of fresh nitrate and chromic acid may be reduced in subsequent batches by approximately the amount equivalent to the recovered metal oxide and chromium oxide content of the recovered extract liquor. The considerable economies resulting from ammonia, nitrate, and chromic acid recovery and reutilization are apparent.

It has been found that by maintaining the same volume-weight ratio of extract liquor to catalyst extracted as has been previously used for acetic acid extraction, such, for example, as set forth in Lazier U. S. 1,746,782, the ammonia concentration may be reduced to 4% with an extraction efficiency equivalent to that of 10% acetic acid.

In order to describe the invention more fully the following example is given, it being understood that the present invention is not limited thereby.

A contact mass is prepared by introducing 330 gallons of water, 200 pounds of "filter cel", 428 pounds of copper nitrate and 176 pounds of chromic acid, into a stirring vessel. The materials thus introduced are stirred until the nitrate and acid are completely dissolved. Thereafter the equivalent of 88 pounds of anhydrous ammonia is added after which the resulting liquor should be slightly alkaline, but, if not, ammonia is slowly added until slight alkalinity is reached. After alkalinity has been reached stirring is continued for a short time and thereafter the precipitated copper ammonium chromate is allowed to settle until it occupies two-thirds of the total volume of slurry. The clear green liquor is decanted and the resultant slurry is washed with stirring, the added water being sufficient to make up the original volume of the slurry. The precipitate is allowed to settle as before, decanted, washed again, and filtered. The filter cake is transferred to a vessel for heating at elevated temperatures and the catalyst heated for four hours at its decomposition temperature of about 450° C. This ignition process results in the decomposition of the copper ammonium chromate to chromite. The ignited catalyst (amounting to approximately 435 pounds) is thereafter cooled to room temperature and then extracted by adding 186 gallons of water and 88 pounds of anhydrous ammonia thereto and stirring. The precipitate is allowed to settle to about 50% of the original volume of slurry and the clear ammonia extract liquor is decanted and pumped into storage. 186 gallons of water is added to the remaining slurry with agitation and then 88 pounds of anhydrous ammonia added and stirring continued for 15–30 minutes longer. The precipitate is allowed to settle again to 50% of the original volume of slurry, and this clear extract liquor is likewise decanted and pumped to storage. The extracted catalyst is thereafter washed five times or more by decantation, the wash water being in each case sufficient to make a total slurry volume of about 500 gallons. After the last washing the catalytic material is filtered, dried for at least 24 hours at 125–135° C., and then screened to suitable size and stored in air-tight containers to prevent absorption of moisture. There results approximately 365 pounds of completed catalyst.

The total amount of aqueous ammonia required for the two extractions above described is 400 gallons, containing 176 pounds of ammonia ($NH_3$). Fifty per cent. of this amount (200 gallons, containing 88 pounds ammonia) is recovered and sent to storage, and is sufficient for precipitation of the next batch of catalyst. Approximately one-third of this amount is required to react with chromic acid to form ammonium bichromate and the remaining two-thirds for precipitation of copper ammonium chromate. This amount of the recovered ammonia liquor may, therefore, be used to aid in dissolving the copper nitrate and chromic acid, and the remainder is then used for precipitation.

The precipitation of catalyst with the recovered ammonia extract liquor may be accomplished as follows: 130 gallons of water is run into a 500 gallon tub and thereto is added 338 pounds of copper nitrate and 172 pounds of chromic acid, stirring being continued until solution is substantially complete. 200 pounds of "filter cel" is added and stirring continued from 5–10 minutes. Approximately 200 gallons of recovered ammonia extract liquor is added at the rate of 3–5 gallons per minute, the mixture being agitated meanwhile. The addition of ammonia is stopped when the liquor becomes slightly alkaline to litmus. The recovered ammonia liquor will be found sufficient to effect complete precipitation, altho slight quantities of additional ammonia may sometimes be required. After precipitation the filtration, drying and ignition are accomplished as outlined in the previous description of the preparation of this catalyst.

The methods described above are equally applicable to the preparation of chromites of hydrogenating metals other than copper, for example, silver, zinc, cadmium, tin, manganese, cobalt, and nickel, may be substituted for copper, the only further requisite being that oxides of these metals be soluble in ammonia.

As an illustration of the application of the catalyst of this invention, an ammonia extracted copper chromite-kieselguhr catalyst, prepared as previously described, was used for the hydrogenation of furfural in the following manner: 200 grams of furfural and 6 grams of the catalyst were heated with agitation in an autoclave at 175° C. and 1500 pounds hydrogen pressure. Rapid absorption of hydrogen occurred and 90–95% of the furfural was hydrogenated to furfuryl alcohol in 15–17 minutes.

In the hydrogenation of cocoanut oil to alcohols, 200 grams of the oil and 14 grams of the ammonia-extracted copper chromite were heated with agitation in an autoclave at 325° C. and 3000 pounds hydrogen pressure. 70–80% conversion of the oil to a mixture of alcohols was obtained. The catalyst caused absorption of hydrogen at the rate of 6200 pounds hydrogen pressure drop per hour. Under similar conditions using an acid extracted catalyst the oil was hydrogenated to substantially the same extent but more slowly, the hydrogen being absorbed at the rate of only 5200 pounds hydrogen pressure drop per hour.

As many widely different embodiments of this invention may be made without departing from the spirit and scope thereof, it is to be understood that I do not limit myself to the specific embodiments thereof except as defined in the appended claims.

I claim:

1. The method of preparing a catalyst which comprises heating to its spontaneous decomposition temperature a multiple chromate of a nitrogen base and a hydrogenating metal whose oxide is soluble in ammonia and thereafter extracting the resulting chromite composition with aqueous ammonia.

2. The method of preparing a catalyst which comprises heating to its spontaneous decomposition temperature a multiple chromate of ammonia and a hydrogenating metal whose oxide is soluble in ammonia and thereafter extracting from the resulting chromite composition the less active constituents with aqueous ammonia, recovering and utilizing at least a part of said ammonia for precipitation of the multiple chromate of ammonia and a hydrogenating metal.

3. The method of preparing a catalyst which comprises heating to its spontaneous decomposition temperature a multiple chromate of ammonia and a hydrogenating metal whose oxide is soluble in ammonia and thereafter extracting the less active constituents from the resulting chromite composition with aqueous ammonia, and utilizing at least a part of the ammoniacal liquor resulting from extracting the chromite composition with ammonia for precipitation of the multiple chromate of ammonia and a hydrogenating metal.

4. The method of preparing a catalyst which comprises heating to its spontaneous decomposition temperature a multiple chromate of ammonia and copper and thereafter extracting the less active constituents from the resulting chromite composition with aqueous ammonia, and utilizing at least a part of said ammonia for precipitation of the multiple chromate of ammonia and hydrogenating metal.

5. The method of preparing a catalyst for hydrogenation of carbon compounds which comprises heating to its spontaneous decomposition temperature a multiple chromate of ammonia and copper and thereafter extracting the less active constituents from the resulting chromite composition with aqueous ammonia, and recovering at least a part of said ammonia for further extractions and utilizing the extracted constituents for preparation of further catalyst.

6. The method of preparing a catalyst which comprises heating to its spontaneous decomposition temperature a multiple chromate of ammonia and a hydrogenating metal whose oxide is soluble in ammonia and thereafter extracting the resultant chromite composition with aqueous ammonia.

PAUL L. SALZBERG.